United States Patent [19]

Tuchiya et al.

[11] Patent Number: 4,559,740
[45] Date of Patent: Dec. 24, 1985

[54] SLIDER ASSEMBLY FOR AUTOMOTIVE SLIDING DOOR

[75] Inventors: Yoshimasa Tuchiya, Ebina; Tatsuo Minami, Isehara, both of Japan

[73] Assignee: Nissan Motor Company, Limited, Yokohama, Japan

[21] Appl. No.: 525,504

[22] Filed: Aug. 22, 1983

[30] Foreign Application Priority Data

Aug. 23, 1982 [JP] Japan ................. 57-145847

[51] Int. Cl.⁴ ............................................. E05D 15/10
[52] U.S. Cl. ........................................ 49/216; 16/106; 16/97; 49/218; 49/223
[58] Field of Search ................... 49/213–216, 49/218, 223, 225; 16/97, 98, 106

[56] References Cited

U.S. PATENT DOCUMENTS 3,011,209  12/1961  Majeske ........................ 16/105
3,728,819   4/1973  Goldbach et al. ............. 49/216
4,152,872   5/1979  Tanizaki et al. .............. 49/214
4,157,846   6/1979  Whitcroft ................... 49/213 X

FOREIGN PATENT DOCUMENTS 956620  4/1964  United Kingdom ............. 49/225

Primary Examiner—Kenneth Downey
Attorney, Agent, or Firm—Schwartz, Jeffery, Schwaab, Mack, Blumenthal & Evans

[57] ABSTRACT

A slider assembly for an automotive sliding door is more compact than conventional ones. This compact slider assembly can be obtained by overlapping part of one of vertical and horizontal rollers and the plane of the other in order to reduce the distance between the rotational axles thereof. A bracket supporting the rollers is formed with a recess receiving part of one of the rollers. In the preferred structure, the periphery of the recess is essentially concentric to the chosen one of the rollers.

7 Claims, 10 Drawing Figures

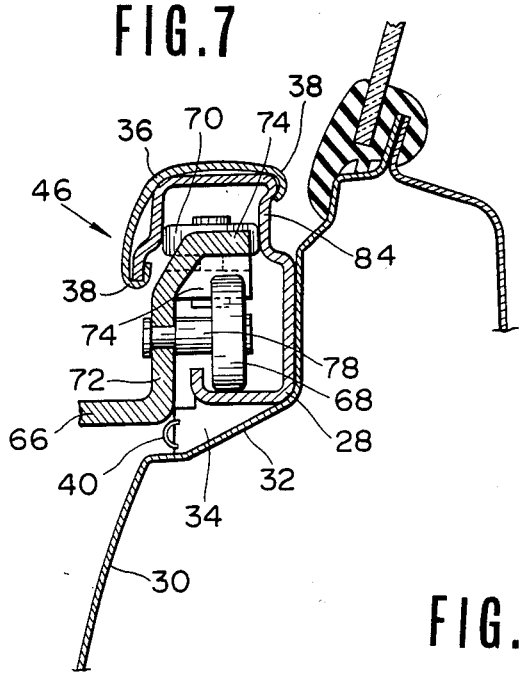
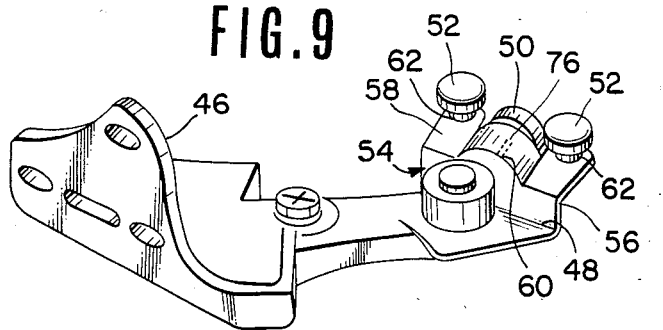
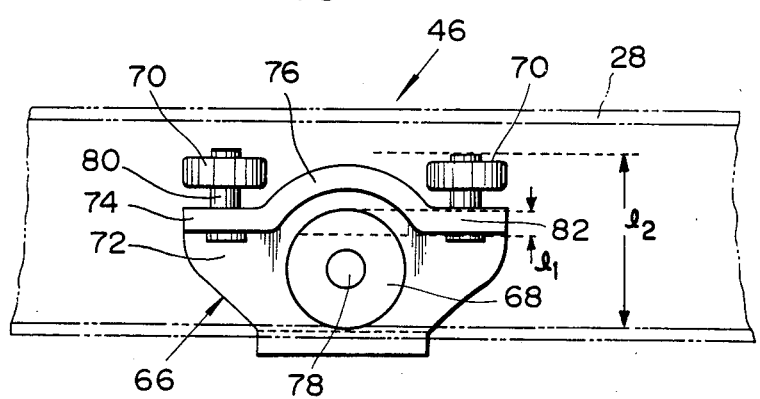

SLIDER ASSEMBLY FOR AUTOMOTIVE SLIDING DOOR

BACKGROUND OF THE INVENTION

The present invention relates generally to a slider assembly for an automotive sliding door. More specifically, the invention relates to a compact slider assembly structure with guide rollers.

For an automotive vehicle, reducing the size of slider assemblies installed on the sliding door provides more room in the vehicle passenger compartment. In addition, from the standpoint of appearance, the vertical size of a guide rail for the slider assemblies should be minimized to facilitate its camouflage by ornamental molding. Of course, the narrower the guide rail, the smaller the slider assembly which can be used.

However, small slider assemblies tend to lack structural strength. Therefore, a slider assembly which is both compact and strong is required.

SUMMARY OF THE INVENTION

Therefore, it is an object of the present invention to provide a slider assembly which is small enough to allow an attractive external appearance for the vehicle and more room in the passenger compartment and which is sufficiently strong to stably support the sliding door.

Another and more specific object of the invention is to provide a slider assembly employing standard-sized rollers while having small over-all dimensions.

To accomplish the foregoing and other objects, a slider assembly according to the present invention has a frame with a depression adapted to receive a vertical roller. A pair of horizontal rollers are mounted on the frame in a spaced-apart relationship and located symmetrically with respect to said depression.

With this structure, the distance between the rotational axes of the horizontal rollers can be reduced. Furthermore, by receiving upper half of the vertical roller, relative distance between vertical roller and horizontal rollers can be reduced. Thus, the over-all size of the slider assembly is smaller than that of conventional assemblies, even though the vertical and horizontal rollers are each of standard size.

According to the present invention, a slider assembly for an automotive sliding door comprises a bracket mounted on the sliding door, a vertical roller rotatable about a horizontal axle extending from the bracket, a horizontal roller rotatable about a vertical axle extending from the bracket at a point near the horizontal axle, and a recessed portion of the bracket adapted to conform to part of one of the vertical and horizontal rollers in order to position part of one of the vertical and horizontal rollers within said recessed portion to reduce a dimension between the axle of said one of the rollers and the other roller.

BRIEF DESCRIPTION OF THE DRAWINGS

The present invention will be described more fully with reference to the accompanying drawings of the preferred embodiment, which the present invention should not be limited to and which should be understood as explanation only.

In the drawings:

FIG. 7 is a cross-section showing the preferred embodiment slider assembly according to the invention as engaging to the guide rail;

FIG. 9 is a perspective view of the slider assembly; and

FIG. 10 is a front elevation of the slider assembly of FIG. 9, as engaged to the guide rail.

DESCRIPTION OF THE PREFERRED EMBODIMENT

Figure 1:
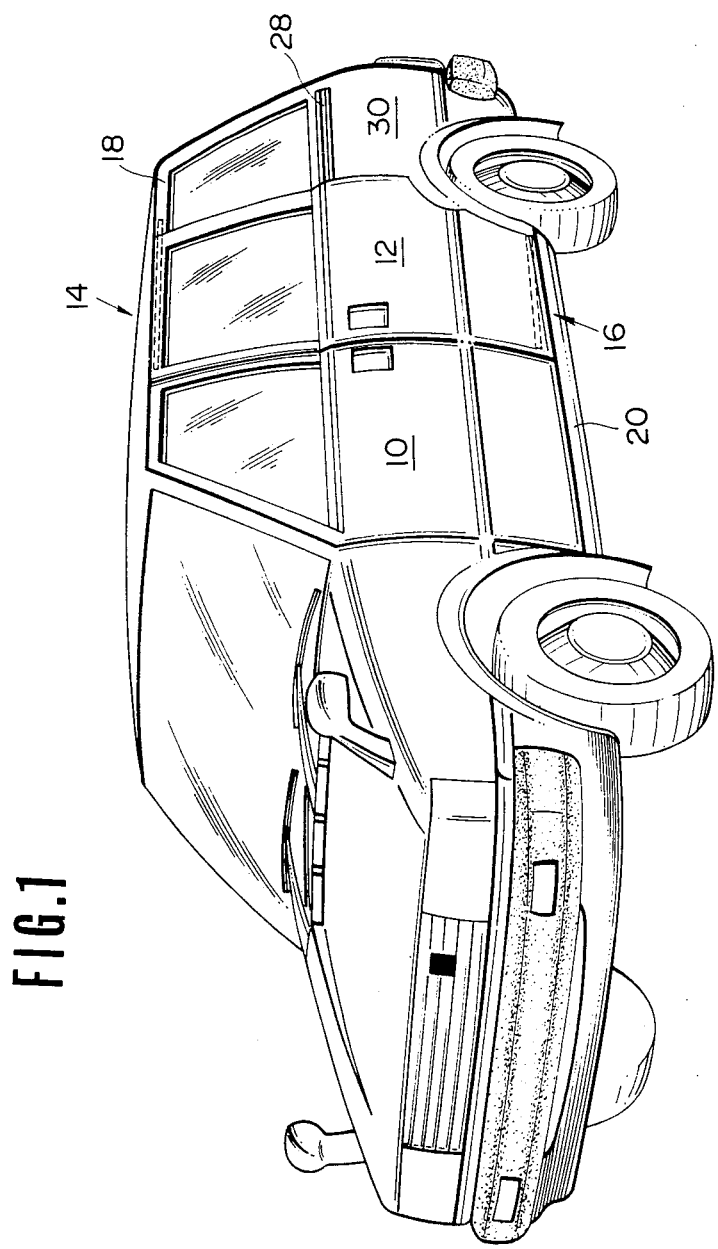
FIG. 1 is a perspective view of an automotive vehicle having a sliding door on which the preferred embodiment of a slider assembly according to the present invention is installed.

Referring now to the drawings, particularly to FIG. 1, a vehicle has a front swinging door 10 hinged at its front vertical edge to the front edge of a door opening, and a rear sliding door 12 slidably suspended on the side of the vehicle body for closing the rear half of the door opening. Upper and lower guide rails 14 and 16 of generally channel-shaped configuration are rigidly secured to roof side rail 18 and side sill 20 respectively.

Figure 2:
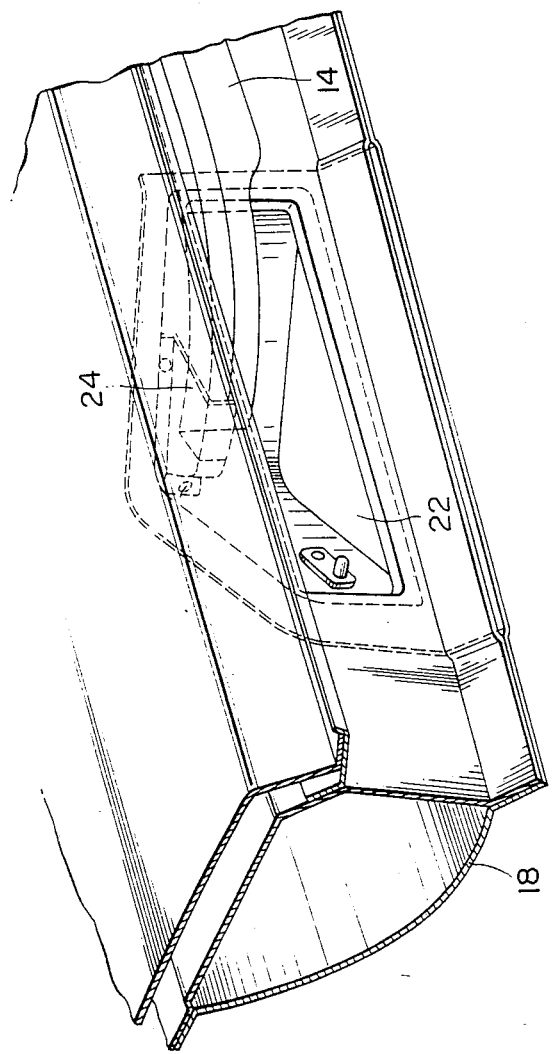
FIG. 2 is an enlarged perspective view of a major section of the vehicle of FIG. 1.
Figure 3:
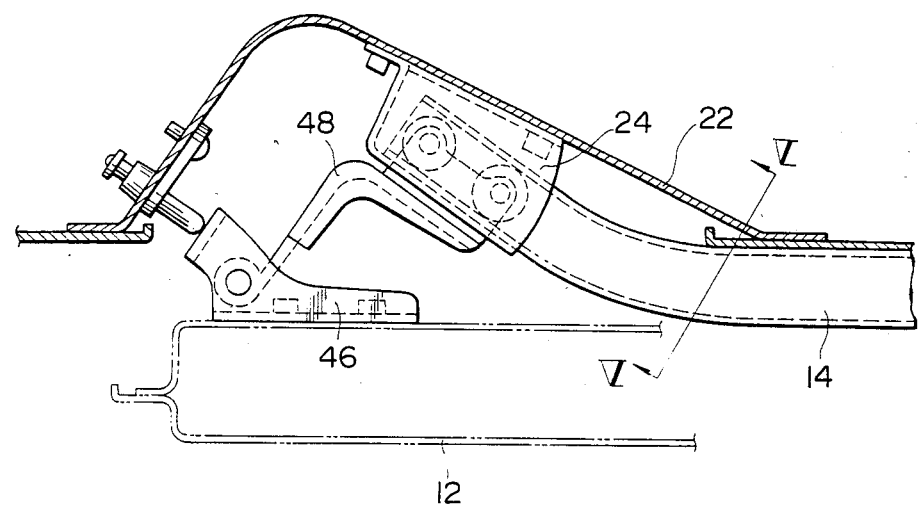
FIG. 3 is a section of the major section of FIG. 2, in which a sliding door with the preferred embodiment of a slider assembly according to the present invention is applied.
Figure 4:
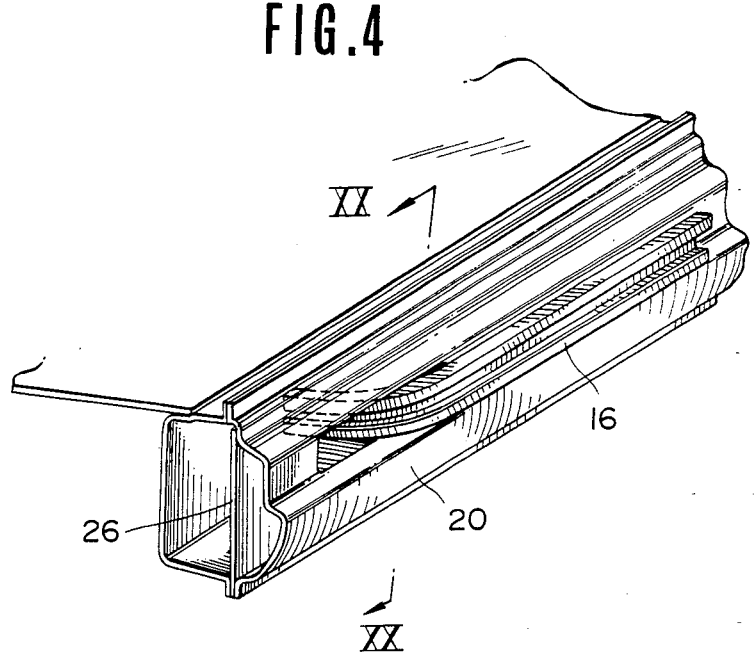
FIG. 4 is a perspective view of the side portion of the vehicle of FIG. 1, showing manner of mounting a lower guide rail on a side sill.
Figure 5:
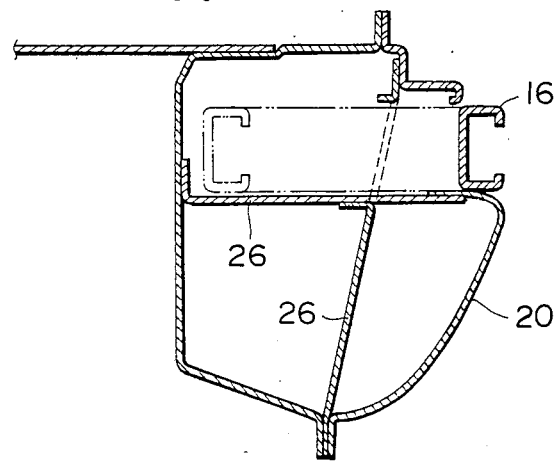
FIG. 5 is a section taken along line V—V in FIG. 3.

The front end of the upper guide rail 14 curves to extend into the interior of the roof side rail 18, as shown in FIGS. 2 and 3. The front end of the upper guide rail 14 is supported by a reinforcement member 22 in the interior space of the roof side rail 18 and is rigidly secured thereto by a rail bracket 24. As shown in FIGS. 4 and 5, the front end of the lower guide rail 16 also curves to extend into the interior of the side sill 20 and is supported by a reinforcement member 26 disposed in the internal space.

Figure 6:
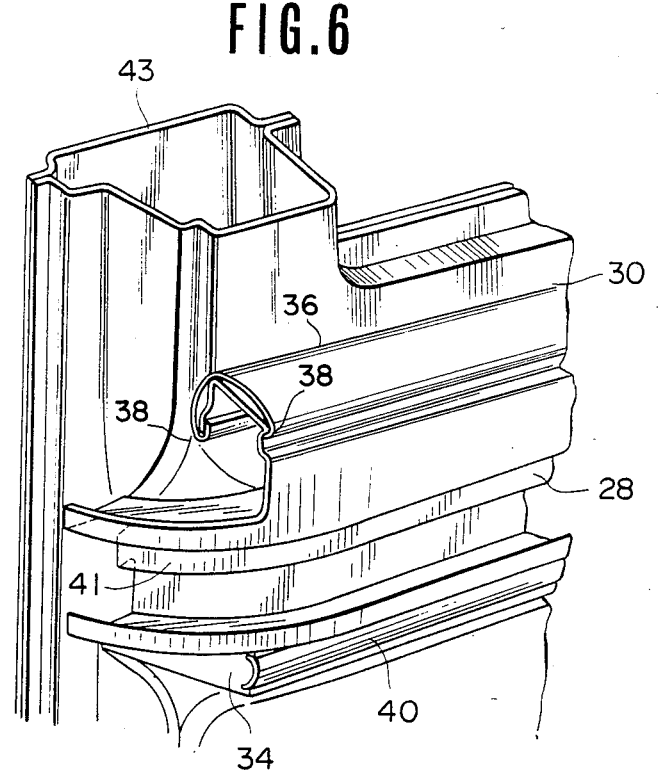
FIG. 6 is an enlarged perspective view of another major section of the vehicle body, showing manner of installation of a waist guide rail.

A waist rail 28 extends along a rear fender 30 of the vehicle. As shown in FIGS. 6 and 7, the waist guide rail 28 is received within a recess 32 formed in the rear fender 30 and supported by a spacer 34. A molding 36 with turned-back edges 38 is fixed to the waist guide rail. The molding 36 is provided to improve the external appearance of the vehicle as well as improving the aerodynamics thereof by providing a smoother external vehicle surface. Lower molding 40 is secured to the spacer 34 to hide the spacer from external view. The waist guide rail 28 has a front end 41 extending partway around a rear pillar 43.

Figure 8:
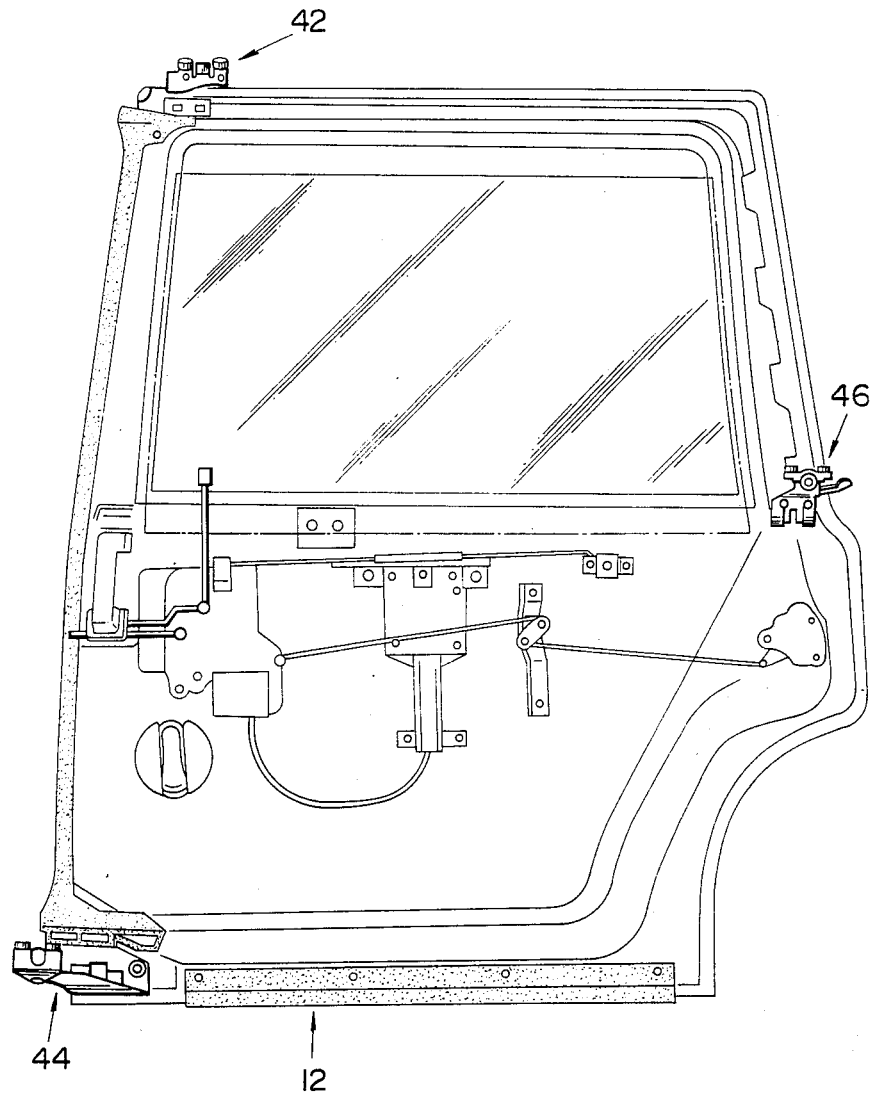
FIG. 8 is a fragmentary plan view showing a sliding door to which the preferred embodiment of the slider assembly of the invention is installed.

Upper, lower and waist slider assemblies 42, 44 and 46 are installed on the rear sliding door 12 for sliding engagement with the foregoing upper, lower and waist guide rails 14, 16 and 28, as shown in FIG. 8. The upper and lower slider assemblies 42 and 44 are of similar structure and, as illustrated in FIG. 9, each of the upper and lower slider assemblies 42 and 44 includes a base bracket 46, a roller bracket 48, a vertical roller 50 and a pair of horizontal rollers 52. The roller bracket 48 is pivotably connected to the base bracket 46 which is, in turn, rigidly secured to the sliding door 12. The roller bracket 48 has a crank-shaped free end 54 with a vertical section 56 and a bifurcate horizontal section 58 extending from the vertical section 56. The vertical roller 50 is rotatably mounted on the vertical section 56 for rotation about a horizontal axle 60. Vertical axles 62 extend vertically from the horizontal sections 58 of the end portion 54 and rotatably support the horizontal rollers 52. The vertical roller 50 is adapted to contact the lower horizontal surface of the guide rail 42 or 44 to support the sliding door against gravitational force. The horizontal rollers 52 are adapted to contact the upper portion of the guide rail 42 or 44 to restrict the lateral movement of the sliding door and to counteract lateral forces applied to the sliding door.

As shown in FIGS. 7 and 10, the waist slider assembly 46 has essentially the same structure as that of the upper and lower slider assemblies. Its includes a base bracket, a roller bracket 66, a vertical roller 68 and a pair of horizontal rollers 70. The end 64 of the roller bracket 66 has an essentially crank-shaped configuration with a vertical section 72 and a horizontal section 74. The horizontal section 74 is formed with a rounded depression 76 near its center. The radius of the depression is selected so that the surface of the depression opposing the vertical roller 68 is essentially concentric to the vertical roller. As shown in FIG. 7, the vertical roller 68 is mounted on the vertical section 72 of the end portion 64 with a vertical rotational axle 78 so positioned that the upper portion of the roller 68 is positioned within the depression. The horizontal rollers 70 are mounted on the horizontal section 74 with vertical axles 80 extending from plane portions 82 of the horizontal section on both sides of the depression 76.

With this roller arrangement, the span between the horizontal rollers is reduced in comparison with the foregoing upper and lower slider assemblies. Furthermore, by inserting the upper portion of the vertical roller into the space defined by the depression to a height of $l_1$, the overall height $l_2$ of the waist slider assembly can be reduced by the amount $l_1$.

Though the waist slider assembly is thus made more compact than the upper and lower slider assemblies, the strength thereof is not affected and so remains equivalent to that of the upper and lower slider assemblies.

As shown in FIG. 7, the waist guide rail 28 of the shown embodiment has a portion 84 constricted so that the horizontal rollers 70 can contact both vertical surfaces of the portion 84 in order to restrict the lateral movement of the sliding door.

Though the foregoing embodiment of the slider assembly is specifically applied to the waist slider assembly, the slider assembly structure according to the present invention may also be applied to upper and lower slider assemblies. Furthermore, although the specific embodiment shows a depression receiving the upper portion of the vertical roller therein to allow of reduction of the overall height of the slider assembly, the present invention may include any suitable modification providing space for the upper portion or the lower portion of the vertical roller therein.

What is claimed is:

1. A slider assembly for an automotive sliding door comprising:
   a bracket mounted on said sliding door said bracket having a horizontal first section and a vertical second section, said horizontal section being bent to define a recessed portion;
   a vertical roller rotatable about a horizontal axle extending from said second section of said bracket, said vertical roller being adapted to be received in said recessed portion at least in part; and
   a horizontal roller rotatable about a vertical axle extending from said first section of said bracket at a point near said horizontal axle.

2. A slider assembly for an automotive sliding door comprising:
   a bracket assembly including a stationary bracket rigidly mounted on said sliding door and a roller bracket pivotable with respect to said stationary bracket said roller bracket having a crank-shaped end portion including a vertical section and a horizontal section extending from the upper end of the vertical section;
   a vertical roller rotatably mounted on said roller bracket;
   a horizontal roller rotatably mounted on said roller bracket;
   a recessed portion formed in one of said vertical section and said horizontal section of said roller bracket in conformance to one of said vertical and horizontal rollers and adapted to receive part of said one of the rollers projects through the plane of the other roller said recessed portion being formed in one of said vertical and horizontal sections by bending the latter in semi-circular form in conformance with said corresponding roller.

3. The slider assembly as set forth in claim 2, wherein another horizontal roller is mounted on another vertical axle extending from said horizontal section parallel to the vertical axle of the other horizontal roller, said vertical roller being located between said horizontal rollers.

4. The slider assembly as set forth in claim 2, wherein said recessed portion of said roller bracket has a peripheral surface essentially concentric to said one of the rollers.

5. The slider assembly as set forth in claim 4, wherein said one of the rollers is the vertical roller.

6. A slide-guide mechanism for an automotive sliding door comprising:
   a guide rail rigidly mounted on a vehicle side frame and having a substantially horizontal first support surface and a substantially vertical second support surface;
   a bracket mounted on said sliding door and having a first plane surface extending substantially parallel to said first support surface and a second plane surface extending substantially parallel to said second support surface;
   a vertical roller rotatably mounted on said second surface of said bracket and engageable with said first support surface of said guide rail;
   a pair of horizontal rollers rotatably mounted on said first surface of said bracket and engageable with said second support surface; and
   a portion of said second surface defining a depression for receiving part of said vertical roller so that said vertical roller is located at an elevation at which said vertical roller projects vertically through the plane of said horizontal rollers.

7. The mechanism as set forth in claim 6, wherein said bracket comprises a fixed bracket rigidly connected to the sliding door and a pivotal bracket pivotably connected to said fixed bracket.

* * * * *